United States Patent [19]

Belova et al.

[11] 4,238,702
[45] Dec. 9, 1980

[54] BAR WINDING OF STATOR OF SLOTLESS-CORE ELECTRICAL MACHINE

[76] Inventors: Tamara N. Belova, ulitsa Budapeshtskaya, 3, korpus 3, kv. 138; Larisa A. Drozdova, prospekt K. Marxa, 25, kv. 26; Anatoly T. Zverev, ulitsa Budapeshtskaya, 31, korpus 1, kv. 58; Jury G. Tjurin, V.O. 8-linia, 55, kv. 1; Garri M. Khutoretsky, ulitsa Altaiskaya, 20, kv. 5, all of Leningrad, U.S.S.R.

[21] Appl. No.: 961,269

[22] Filed: Nov. 16, 1978

[51] Int. Cl.³ .............................................. H02K 3/00
[52] U.S. Cl. ................................... 310/179; 310/45; 310/260
[58] Field of Search ............... 310/179, 180, 184, 198, 310/43, 199–208, 260, 216, 45; 336/206

[56] References Cited

U.S. PATENT DOCUMENTS

| | | | |
|---|---|---|---|
| 1,836,882 | 12/1931 | Nilsson | 310/179 |
| 3,082,337 | 3/1963 | Horsley | 310/179 |
| 3,419,905 | 12/1968 | Letter | 310/179 |
| 3,488,537 | 1/1970 | Beddows | 310/179 |
| 3,529,192 | 9/1970 | Davies | 310/179 |
| 3,538,364 | 11/1970 | Favereau | 310/180 |
| 3,921,017 | 11/1975 | Hallerback | 310/43 |
| 3,963,950 | 6/1976 | Watanabe | 310/179 |
| 4,028,572 | 6/1977 | Baltisberger | 310/201 |
| 4,135,107 | 1/1979 | Kamerbeek | 310/179 |
| 4,151,433 | 4/1979 | Flick | 310/208 |

Primary Examiner—R. Skudy
Attorney, Agent, or Firm—Lackenbach, Lilling & Siegel

[57] ABSTRACT

A stator bar winding of a slotless-core electrical machine comprises conductors enclosed in an insulating sheath with the conductors arranged in three concentric layers. Conductors of the inner layer are placed underneath every second conductor of the middle layer, whereas the conductors of the outer layer are placed over every other conductor of the middle layer. The conductors of the middle layer are bent in their overhang portions from the axial direction to the angle $(90°-\alpha_1)$ which is twice as small as the angle $90°-\alpha_2)$ to which the overhang portions of two other layers are bent. The conductors of the middle layer are also electrically connected in series and alternately to respective conductors of the outer layer or inner layer.

6 Claims, 4 Drawing Figures

BAR WINDING OF STATOR OF SLOTLESS-CORE ELECTRICAL MACHINE

This invention relates to electrical machine building and, in particular, to a bar winding of a stator of an electrical machine featuring a slotless core.

The invention is predominantly used in electrical machines equipped with a slotless core, mainly in turbo-generators.

In electrical engineering the tendency is to concentrate on turbo-generators of larger output. The growth of the generator power is accompanied by lengthening of the overhang of overhang portions of the stator windings, which results in more complex designs of windings and larger leakage fields and impedance of windings. In large or powerful generators the overhang portion amounts to about 0.9 of the stator core bore.

The bar winding of a stator of an electrical machine equipped with a slotless core is currently divided into an active portion and an overhang portion. Bars or conductors of such a winding are arranged in the active portion in two layers and transition from one layer to another is done by bending the overhang portions of the conductors. Overhang portions may have cone or cylinder sections and are connected in a wave or lap fashion. Such electrical machines are characterized by low density of conductors in the stator active portion, which is due to the dimensions of the conductors, permissible distance between the conductors along the winding pitch and comparatively long overhang portions. Besides, the length of overhang portions depends on the angle to which it is bent from the axis direction of the conductor, which itself depends upon the distance between adjacent conductors of one coil group. The larger the distance the less is the length of the overhang portions.

There is known a bar stator winding of a slotlesscore electrical machine, comprising electrically coupled conductors arranged in concentric layers, parallel to one another in the active portion of the stator and bent from the axial direction in the overhang portions. The conductors are enclosed in an insulating sheath secured on a core and are located in the air gap between the stator and rotor/cf., for example, Great Britain Patent No. 837,546.

In this winding conductors are arranged in two layers within a cylindrical container. Conductors are insulated from one another and the insulation is encased into an electrically conducting sheath with high electrical resistance. Conductors are electrically connected in a conventional manner.

In such a winding arrangement of conductors in the active portion results in comparatively low density of the conductors in the stator active portion. Besides, the length of overhang portions increases with the rise of the power of the electrical machine. The above mentioned factors contribute to an undesired increase of the dimensions of the electrical machine and distortion of its design parameters.

It is an object of this invention to provide a bar winding of a stator of an electrical machine equipped with a slotless core, which helps to increase the density of conductors in the stator active portion.

Another object of the invention is to shorten the length of the overhang winding portions in order to make the machine smaller.

The invention resides in a bar winding of a stator of an electrical machine with a slotless core, comprising electrically coupled conductors arranged in concentric layers parallel to one another in the active portion of the stator and bent from the axial direction in the overhang portions. The conductors are placed in a sheath made of an insulating material, secured on a core and located in the air gap between the stator and rotor. Moreover, the conductors in the active and the overhang portions of the winding are arranged in three layers, with conductors of the inner layer being placed underneath every second conductor of the middle layer, whereas the conductors of the outer layer are placed over every other conductor of the middle layer. The number of conductors in the inner and outer layers are equal to the number of conductors of the middle layer, and the middle layer conductors are bent in the overhang portions to an angle $(90° - \alpha_1)$ which is approximately twice as small as the angle $(90° - \alpha_2)$ to which the conductors of two other layers are bent in the overhang portions. The middle layer conductors are electrically connected in series and alternately with respective conductors of the outer or inner layer.

The present novel embodiment of a bar winding provides for a less cumbersome electrical machine through shorter overhang portions of the winding. At the same time, the density of conductors in the stator active portion rises by means of increasing the distance between the nearest conductors of the upper and lower layers, which belong to one coil group, and, secondly, due to the fact that the overhang portions of the middle layer conductors are bent to a lesser angle as compared to the conductors of two other layers.

The invention will now be described in greater detail with reference to a specific embodiment thereof, taken in conjunction with the accompanying drawings, wherein.

Figure 1:
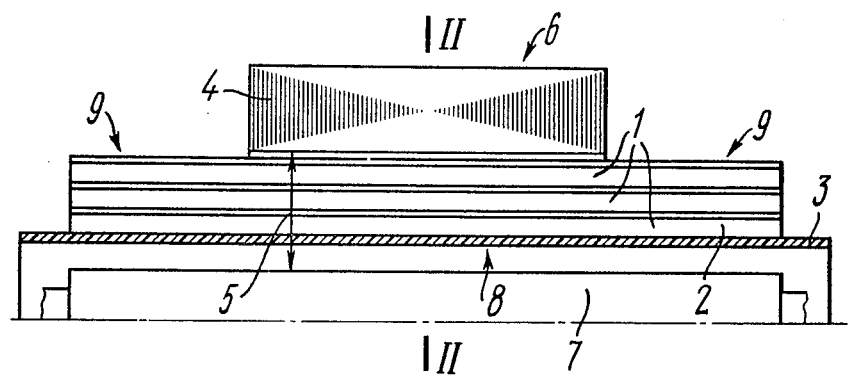
FIG. 1 is a longitudinal sectional view of a bar stator winding of an electrical machine equipped with a slotless core embodying the invention.

The winding of a stator of an electrical machine equipped with a slotless core comprises electrically coupled conductors 1 (FIG. 1) featuring overhang portions 2 bent in the axial direction. The conductors 1 are placed in a sheath 3 made of an insulating material. In this embodiment, fiber-glass plastic material is used as insulation. The sheath 3 is secured on a core 4 in an air gap 5 between a core 4 a stator 6 and a rotor 7.

In this embodiment, the sheath 3 is a solid unit featuring slots wherein the conductors 1 are subsequently positioned.

Figure 2:
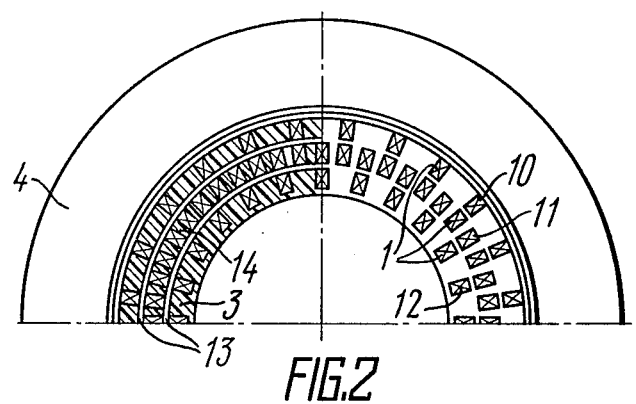
FIG. 2 is a sectional view taken along the line II—II of FIG. 1.

The conductors 1 are arranged in an active portion 8 and an overhang portion 9 in three concentric layers 10, 11, 12 (FIG. 2). In this case, in the active portion 8 some conductors 1 of the middle layer 11· are placed over every second conductor 1 of the inner layer 12 and some conductors 1 are placed underneath every other conductor 1 of the outer layer 10. Here the number of the conductors 1 of the middle layer 11 is equal to the sum of the conductors 1 in two other layers 10 and 12.

In another embodiment, the sheath 3 is made sectional. Each layer 10, 11, 12 is separated one from another by a binding 13 (shown on the left in FIG. 2). Spacers 14 made of an insulating material are fitted between the conductors 1.

Figure 3:
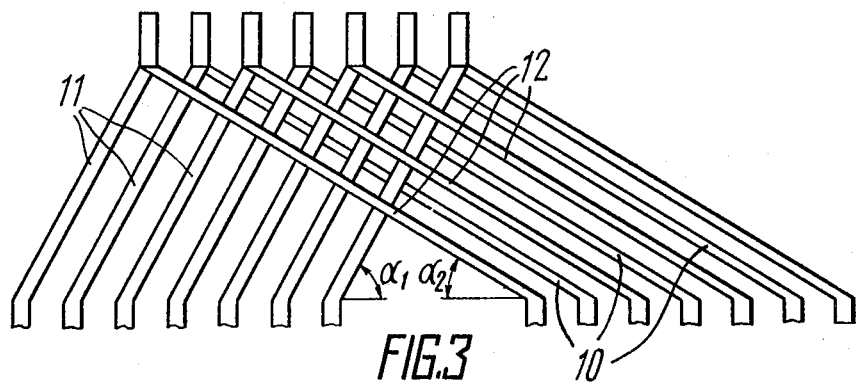
FIG. 3 is a partial development or exploded view of the overhang portion of a bar winding made up of three layers.

The overhang portions 2 of the conductors 1 of the middle layer 11 are bent to an angle $(90° - \alpha_1)$ (FIG. 3) which is approximately twice as small as an angle $(90° - \alpha_2)$ to which the overhang portions 2 of the conductors of two other layers 10 and 12 are bent. In this case, the conductors 1 of the middle layer 11 are connected in series and alternately to each second respective conductor of one of two other layers 10 and 12 thus forming a lap circuitry.

Figure 4:
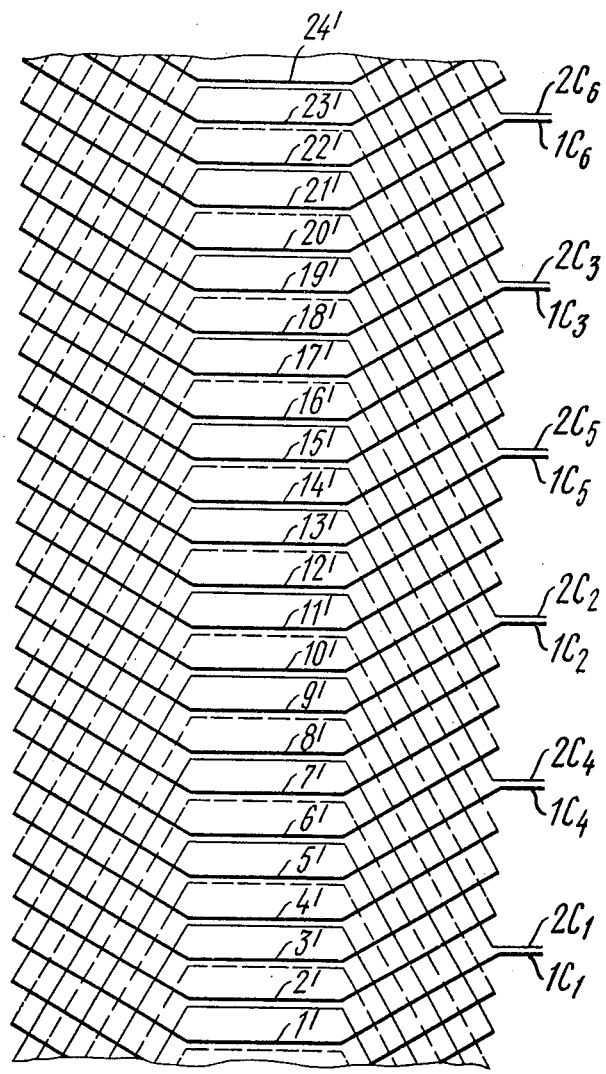
FIG. 4 illustrates a connection diagram of a bar winding of an electrical machine, made in accordance with the invention.

Below is an electrical circuit of the proposed three-layer winding for a three-phase two-pole electrical machine, comprising six coil groups $IC_1-IC_4$ (FIG. 4); $2C_1-2C_4$; $IC_2-IC_5$; $2C_2-2C_5$; $IC_3-IC_6$; $2C_3-2C_6$. The conductors 1 (FIG. 1) of the winding of the stator 6 in the active portion 8 are arranged in the air gap 5 of the electrical machine circumferentially along the inner cylindrical surface of the core 4 of the stator 6 by the series of turns $1'-24'$ (FIG. 4).

The series of the conductors 1 (FIG. 1) which is indicated by an even number will be referred to as even series. The words "even" and "odd" are used here only for convenience. In each coil group the conductors 1 of the middle layer 11 shown by continuous thick lines are alternately connected to the conductors 1 of the outer layer 10 shown by dotted lines and of the inner layer 12 shown by continuous thin lines.

Thus, for example, in the coil group $IC_1-IC_4$ the conductor 1 of the series $I^1$ of the middle layer 11 is connected to the conductors 1 of the series $II^1$ located in the outer layer 10 of the winding, then it is further connected to the conductor 1 of the series $2'$ of the middle layer 11 and further to the conductors 1 of the series $12'$ located in the inner layer 10 of the winding, and so on.

The other coil groups $2C_1-2C_4$; $1C_2-1C_5$ etc. are formed in a similar way.

The overhang portions 2 (FIG. 1) of the conductors 1 of the odd series $1',3',5'$ and others (FIG. 4) are arranged in the outer layer 10 (FIG. 3) of the winding in relation to the stator axis, the overhang portions 2 (FIG. 1) of the conductors 1 of the even series $2',4',6'$ (FIG. 4) and others are arranged in the inner layer 12 (FIG. 3) of the winding in relation to the longitudinal axis of the stator, whereas the conductors 1 of the middle layer 11 of the winding are arranged both in the even and odd series.

The proposed invention ensures a 20–30% cut or reduction in the length of the overhang portions of the winding as compared to the known two-layer bar windings.

What is claimed is:

1. A bar winding of a stator of an electrical machine having a rotor, a slotless core, and a stator having an active portion and an overhang portion with an air gap between the stator and said rotor; said winding comprising:

a sheath made of an insulating material, secured on said core of said electrical machine in said air gap between said stator and said rotor;

conductors arranged in said sheath in the form of three concentric layers forming inner, middle and outer layers;

said conductors arranged parallel to one another in said active portion of said stator;

said conductors of said inner layer, arranged underneath every second conductor of said middle layer;

said conductors of said outer layer, arranged over every other said conductors of said middle layer;

the number of said conductors of said middle layer is equal to the sum of said conductors in said inner layer and said outer layer;

said conductors of said middle layer being bent in said overhang portions from the axial direction to an angle which is approximately twice as small as the angle to which said conductors of each said outer and inner layers are bent in said overhang portions; and said conductors of said middle layer, being electrically coupled in series and alternately to every other respective conductors of one of two said other layers.

2. The bar winding according to claim 1, including spacers of an insulating material disposed between said conductors.

3. The bar winding according to claim 1, including a binding separating each layer from one another.

4. The bar winding according to claim 1, wherein said conductors form an electrical winding circuit for a three-phase two-pole electrical machine having six similar coil groups.

5. The bar winding according to claim 1, wherein said sheath is made in the form of a solid unit having a plurality of slots, one for each of said conductors.

6. The bar winding according to claim 1, wherein said inner, middle and outer layers form separate sectional units of said sheath.

* * * * *